May 10, 1955

H. H. FALKMAN ET AL 2,707,978

BARK-CUTTING MACHINE HAVING YIELDABLE
AND INTERCONNECTED SUPPORTS

Filed April 10, 1951

4 Sheets-Sheet 1

United States Patent Office 2,707,978
Patented May 10, 1955

2,707,978

BARK-CUTTING MACHINE HAVING YIELDABLE AND INTERCONNECTED SUPPORTS

Hans Hugo Falkman, Johanneshov, Nial Torbjörn Karlén, Stockholm, and Erik Magnus Olsson, Nacka, Sweden, assignors to Aktiebolaget Atlas Diesel, Nacka, Sweden, a corporation of Sweden Application April 10, 1951, Serial No. 220,154
Claims priority, application Sweden April 11, 1950

6 Claims. (Cl. 144—208)

The present invention relates to bark cutting machines comprising a rotatable cutter and the invention is particularly related to such bark cutting machines which are moved by hand along a log with the axis of rotation of the cutter disposed transversely to the longitudinal axis of the log. The invention also relates to cutters and knives for such bark cutting machines.

One object of the invention is to provide a bark cutting machine which has low weight and is of simple and rigid construction and in which ample space is provided for the passage of the chips produced during the cutting operation. A further object of the invention is to provide means for guiding the bark cutting machine along a log. A still further object of the invention is to provide a cutting machine in which the cutter comprises any number of fixed knives with a shape producing a substantially V-shaped cut which within wide limits corresponds rather well to a portion of the periphery of logs of different diameters. A still further object of the invention is to provide a bark cutting machine having a cutter producing a symmetrical curved cut and in which the machine is guided so that the plane of symmetry of the cut is substantially a plane through the longitudinal axis of the log. A still further object of the invention is to provide simple, rigid and light cutters and knives for bark cutting machines which are simple in manufacture.

Figure 1:
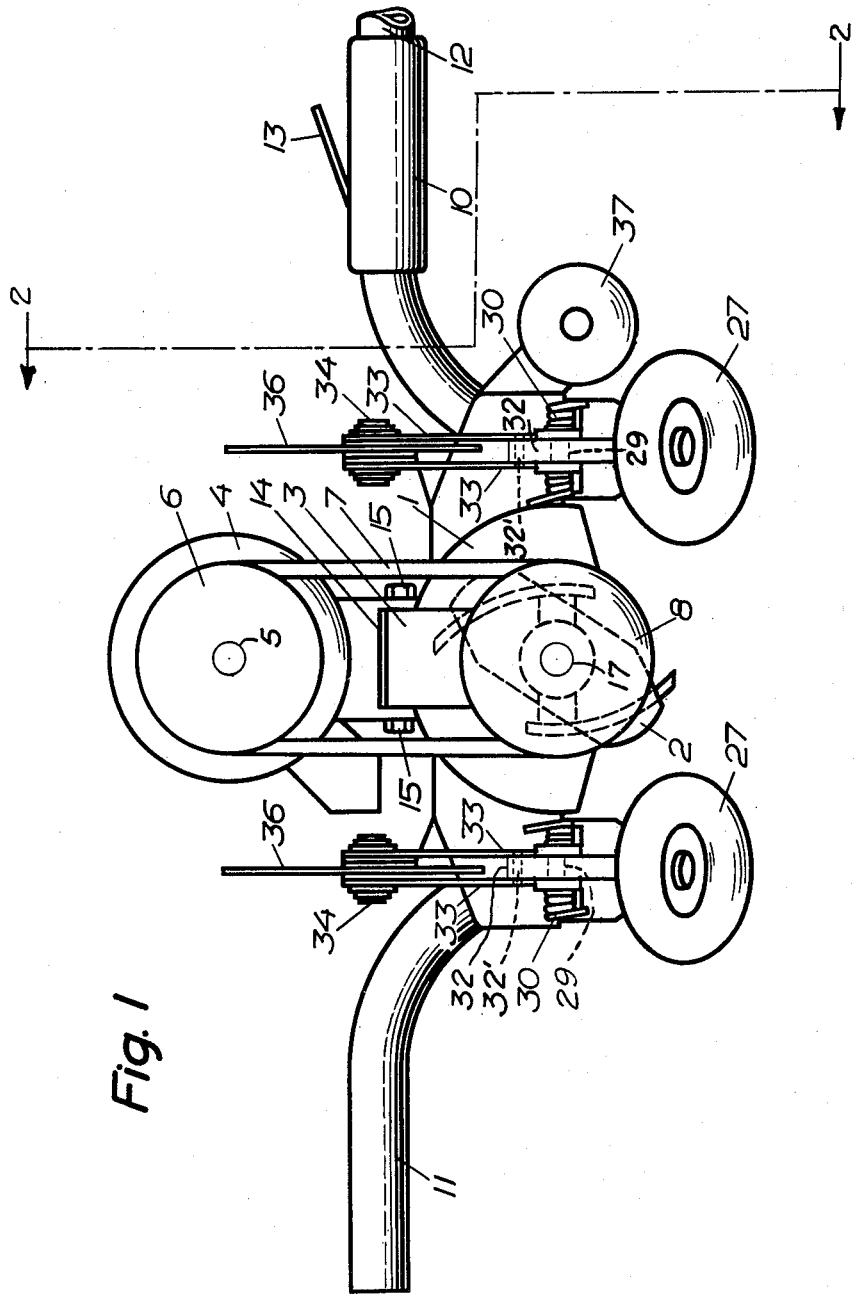
Figure 2:
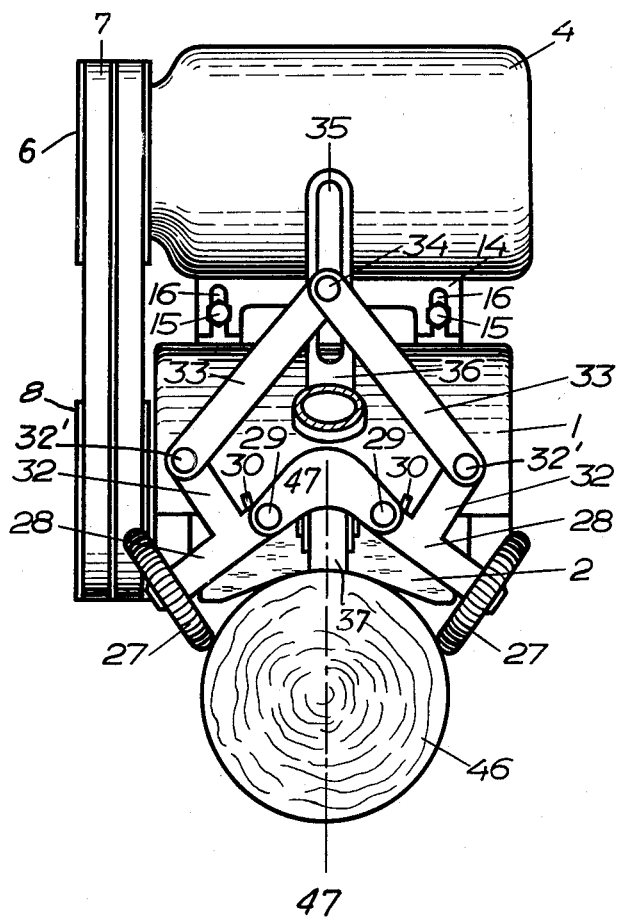
Figure 3:
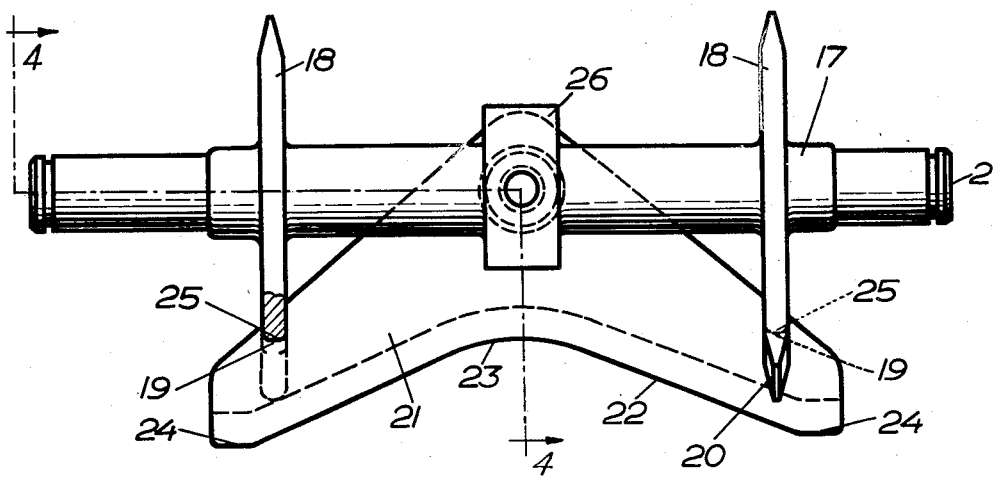
Figure 4:
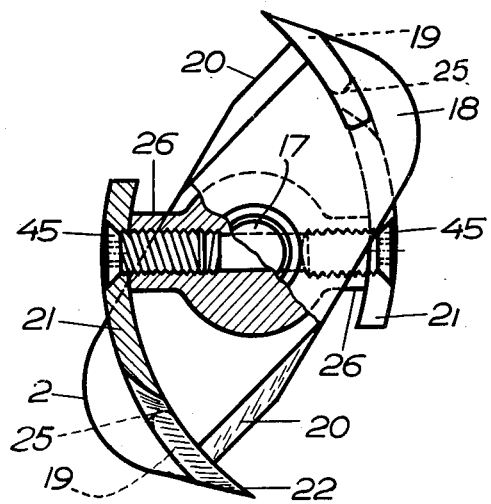
Figure 5:
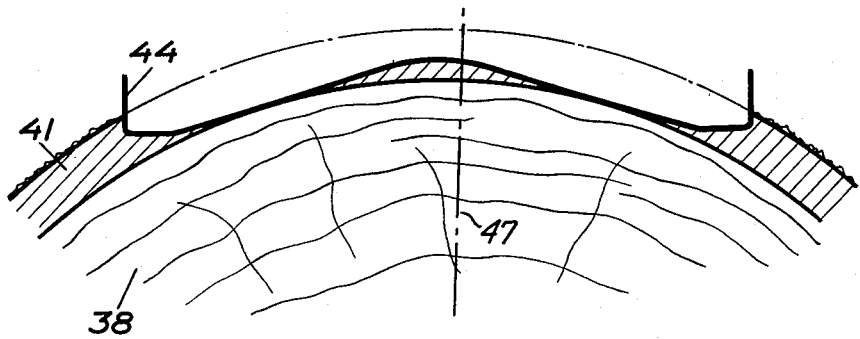
Figure 6:
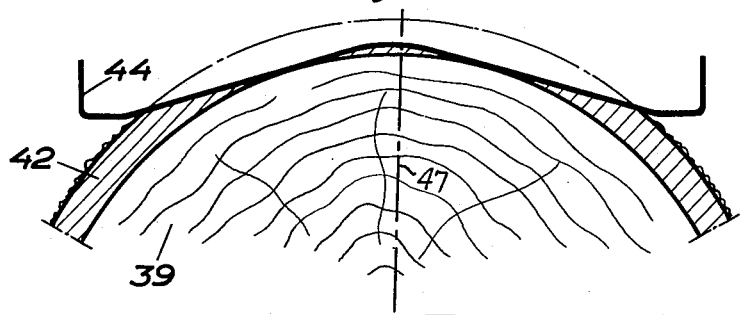
Figure 7:
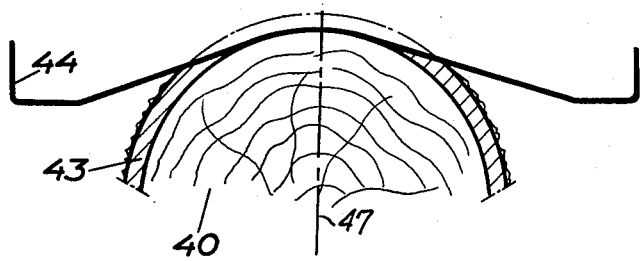

In the accompanying drawings one embodiment of a bark cutting machine according to the invention, a cutter for such a machine, and profiles produced by such a cutter upon operation on logs of three different diameters are illustrated by way of example, it being understood, however, that these showings are by no means limiting for the invention which may be varied in different ways within the scope of the claims. Fig. 1 is a side elevation of a bark cutting machine according to the invention, and Fig. 2 is an end elevation of said machine, partly in section, as indicated by the line 2—2 in Fig. 1. Fig. 3 is a fragmentary front elevation on a larger scale of a cutter for a machine according to Figs. 1 and 2, one knife only of said cutter being illustrated in the figure and one of the knife supports being broken away and shown partly in section. Fig. 4 is a composite end elevation and partial cross section of the cutter, as taken on the line 4—4 of Fig. 3, but includes the knife which was omitted in Fig. 3. Figs. 5, 6 and 7 illustrate in cross section cuts produced by the cutter according to Figs. 3 and 4 in the bark of logs of three different diameters.

The bark cutting machine according to Figs. 1 and 2 is a machine driven hand tool for operation longitudinally of a log with the axis of rotation of the cutter directed transversely to the longitudinal axis of the log. The machine consists of a frame or housing 1 in which a cutter generally designated by the reference numeral 2 is rotatably journalled. The housing 1 forms a bracket 3 for carrying a motor 4 which may be a compressed air driven motor, an internal combustion motor, an electric motor, or any other suitable motor. The shaft 5 of the motor 4 carries a pulley 6 for a V-belt 7 which drives a wheel 8 secured on a shaft 17 of the cutter 2. The V-belt drive is protected by a cover (not shown) and which is carried by the housing 1. The housing covers and protects the cutter 2 and is provided with handles 10 and 11 disposed behind and in front of the cutter 2 when looking in the direction of feed of the machine. In the embodiment illustrated in Figs. 1 and 2 the motor 4 is a compressed air driven motor, and a supply conduit 12 for compressed air is carried through the handle 10 to the motor. For controlling the operation of the motor a main valve of conventional design and having an operating lever 13 is disposed in the handle 10. The motor 4 has a support 14 designed so as to permit adjustment of the tension of the V-belt 7, and for this purpose the support 14 has two lugs embracing the bracket 3 on the cutter housing 1. The support 14 is secured to the bracket 3 by means of screws 15 extending through elongated openings 16 in the lugs of the support 14 thereby permitting adjustment of the tension of the V-belt 7.

The cutter 2 provided in the bark cutting machine according to Figs. 1 and 2 comprises the shaft 17 forming the hub portion of the cutter, two transverse walls 18 which may be welded onto the shaft or secured to the shaft in any other way or made integral with the shaft, as indicated in Figs. 3 and 4, and two knives 21 carried by the transverse walls and the shaft. The transverse walls 18 are provided with slots 19 formed in the leading edge 20 of the walls, and in which slots the knives 21 are inserted. The knives 21 extend along the hub portion or shaft 17 of the cutter at such a distance that a large free area for the passage of the chips is provided between the knives and the hub portion. The knives 21 are formed by blanks of open V-shape cut out from tubular material, and the knives consequently form portions of cylinders, as is obvious from Fig. 4. The knives have an edge curve 22 which forms an open V preferably having about 140° angle between the shanks and rounded at the bottom of the V as indicated at 23. The curve 23 is formed so that the cut produced by the knife 21 fits the curvature of the smallest diameter log for which the cutter is intended. At the free ends of the shanks of the V the edge of the knife forms portions 24 substantially parallel to the axis of the cutter and extending substantially along a generatrix of the cylinder. Two slots 25 are provided in the trailing edge of each of the knives 21, the spacing of the slots corresponding to the distance between the two transverse walls 18 so that the slots 25 will register with the slots 19 of the transverse walls 18 to form joints which engage one another like two forks and thus lock the knives in the transverse walls against relative movement in two directions. Oppositely extending and interiorly threaded abutments 26 are formed centrally on the hub portion 17, and central portions of the trailing edges of the knives 21 are apertured to receive screws 45 which thread into the abutments and thus lock the knives 21 and the transverse walls 18 against relative movement in a third direction. The fastening points of the knives form a triangle, and a very efficient and simple fastening of the knives is obtained in this manner, and such fastening also simplifies the exchange of knives. As obvious from Fig. 3 the edge curves 22 and 23, and the straight edge portions 24 of the knives 21 are made symmetrical relative to a plane perpendicular to the shaft 17 and containing the common axis of the threaded abutments 26.

In order to guide the bark cutting machine along the logs the machine is provided with guiding means comprising four supporting and guide wheels 27 journaled at the ends of transverse levers 28 swinging on trunnions 29 having springs 30 provided thereon which act to force the levers 28 with the guide wheels 27 against a log, for instance the log 46 indicated in cross section in Fig. 2. The levers 28 are provided with upwardly directed arms 32 pivotally connected by pins 32' to pairs of links 33 having common pins 34 guided in vertical slots 35 in plates 36 secured to the housing 1. The guiding of the pins 34 in the slots 35 results in forced guiding of the wheels 27 causing both wheels of each pair to take symmetric relative positions one on each side of the transverse plane of symmetry of the cutter 2. The bark cutting machine is furthermore provided with a supporting roller 37 journaled at the rear end of the machine and forming a non-yielding support on which the machine may be swung during operation in order to modify the depth of the cut which is obviously increased when the machine is pressed with increased force against the log by means of the handle 11.

Figs. 5–7 illustrate the profiles removed by the described cutter upon operation on logs of different diameters. The log 38 according to Fig. 5 has a diameter of about 10 inches, whereas the log 39 in Fig. 6 has a diameter of about 6 inches, and the log 40 in Fig. 7 a diameter of about 3 inches. In said figures, 41, 42 and 43, respectively, indicate the bark, the main part of which it is desired to remove. 44 indicates the curve or profile cut away by the cutter 2, and it is obvious from Figs. 5–7 that said curve corresponds sufficiently close to the curvature of logs of different diameters to cause a small portion only of the bark to be left remaining on the log.

The bark cutting machine above described and illustrated in the drawings operates in the following manner:

During barking the machine is placed with the axis of rotation of the cutter 2 directed transversely to the longitudinal axis of the log. A slight pressure towards the log is applied on the machine so that the roller 37 and the cutter 2 engage the log. The wheels 27 are then pressed symmetrically outwardly so that the machine rides on the log with the plane of symmetry of the cutter coinciding with the plane 47 containing the common axis of threaded abutments 26, 26 and the longitudinal axis of the log indicated in Figs. 2, 5, 6 and 7. Upon depression of the lever 13 compressed air is supplied to the motor 4 so that the motor rotates and the cutter starts to work. By using the roller 37 as a pivot or fulcrum the operator may control the depth of the cut by pressing the handle 11 more or less against the log. The weight of the machine and/or the pressure by means of which it is pressed against the log together with the guiding wheels 27 causes the plane of symmetry of the cutter automatically to substantially coincide with the plane 47 through the longitudinal axis of the log irrespective of the diameter of the log.

The invention also includes the special cutter and knives employed in the bark cutting machine according to the invention. Naturally, the cutters may comprise any number of knives, and the knives may be formed from substantially plane or other blanks. The knives may also be otherwise shaped than hereinabove described and illustrated on the drawings, and for operation on logs of larger dimensions, for instance, the angle between the shanks of the V-edge may vary up to about 180°. The guiding wheels 27 and the roller 37 may be replaced by suitable guiding surfaces or other guiding means on which the machine slides. Sometimes the guiding wheels may be dispensed with. The handle 11 may be replaced by a transverse handle.

Claims directed to the subcombination of cutter structure herein disclosed are, in compliance with the final requirement for division, made the subject of applicants' copending divisional application Serial No. 297,636, filed July 8, 1952, issued concurrently herewith.

What we claim is:

1. A bark cutting machine comprising a housing, a cutter rotatably journalled in said housing and having a shape which produces a cut with a profile having a plane of symmetry perpendicular to the axis of rotation of said cutter, power means on said housing for rotating the cutter, means for yieldingly supporting the machine on a log, said means being disposed one at each side of said plane of symmetry, and means for guiding said supporting means relative to each other so that they always take symmetric relative positions with regard to the plane of symmetry.

2. A bark cutting machine comprising a housing, a cutter rotatably journalled in said housing and having a shape which produces a cut with a profile having a plane of symmetry perpendicular to the axis of rotation of said cutter, power means on said housing for rotating the cutter, means for supporting the machine on a log with the axis of rotation of the cutter disposed transversely to the longitudinal axis of said log, said means being disposed one at each side of said plane of symmetry, springs for pressing said means towards the log, and means for guiding the supporting means relative to each other so that they always take symmetric relative positions with regard to the plane of symmetry.

3. A bark cutting machine comprising a housing, a cutter rotatably journalled in said housing and having a shape which produces a cut with a profile having a plane of symmetry perpendicular to the axis of rotation of said cutter, a motor on said housing for rotating the cutter, wheels for supporting the machine on a log with the axis of rotation of the cutter disposed transversely to the longitudinal axis of said log, levers journalled on the housing and carrying said wheels at their free ends and disposed one at each side of said plane of symmetry and extending transversely to the plane of symmetry, springs for pressing said levers and wheels towards the log for guiding said machine on said log, and means for guiding the levers relative to each other so that they always take symmetric relative positions with regard to the plane of symmetry.

4. A bark cutting machine comprising a housing, a cutter rotatably journalled in said housing and having a shape which produces a cut with a profile having a plane of symmetry perpendicular to the axis of rotation of said cutter, power means on said housing for rotating the cutter, and means for yieldingly supporting the machine on a log, said means being disposed one at each side of said plane of symmetry and remote from the operating point of the cutter.

5. A bark cutting machine comprising a housing, a cutter mechanism rotatably journaled in said housing and having a shape which produces a curved cut with a profile having a plane of symmetry perpendicular to the axis of rotation of said cutter mechanism, a power drive connected to the cutter mechanism for rotating the same, means for yieldingly supporting the machine on a log, said means being disposed spaced from the cutter mechanism one at each side of said plane of symmetry, means for guiding said supporting means relative to each other so that they always take substantially symmetric relative positions with regard to the plane of symmetry, and a roller carried by the housing for supporting the machine on a log and disposed spaced from the cutter mechanism substantially in the plane of symmetry with its turning axis parallel to said axis of rotation of the cutter mechanism.

6. A bark cutting machine comprising a housing, a cutter rotatably journaled in said housing and having a shape which produces a cut with a profile having a plane of symmetry perpendicular to the axis of rotation of said cutter, power means on said housing for rotating the cutter, and means for yieldingly supporting the machine on a log, said means comprising a plurality of log engaging elements providing two elements on each side of said plane of symmetry and with the elements on each such side being located at places remote from and on respectively opposite sides of the axis of rotation of said cutter.

References Cited in the file of this patent

UNITED STATES PATENTS

| | | |
|---|---|---|
| 692,184 | Kline et al. | Jan. 28, 1902 |
| 1,715,949 | Rich | June 4, 1929 |
| 1,728,570 | Lagus | Sept. 17, 1929 |
| 1,811,155 | Rich | June 23, 1931 |
| 2,415,601 | Milward | Feb. 11, 1947 |

FOREIGN PATENTS

| | | |
|---|---|---|
| 38,655 | Sweden | Apr. 14, 1915 |
| 526,647 | Germany | June 8, 1931 |